US010516925B2

(12) United States Patent
VanSickel et al.

(10) Patent No.: US 10,516,925 B2
(45) Date of Patent: Dec. 24, 2019

(54) MULTIFUNCTIONAL AUDIO SPEAKER SYSTEM

(71) Applicant: Audio Accessories Group, LLC, Tempe, AZ (US)

(72) Inventors: Larry VanSickel, Phoenix, AZ (US); Wang Hai, Ningbo (CN); Gu Wendong, Ningbo (CN); Zhou Liang, Ningbo (CN)

(*) Notice: Subject to any disclaimer, the term of this patent is extended or adjusted under 35 U.S.C. 154(b) by 0 days.

(21) Appl. No.: 16/147,700

(22) Filed: Sep. 29, 2018

(65) Prior Publication Data

US 2019/0098386 A1   Mar. 28, 2019

(51) Int. Cl.
| H04R 1/02 | (2006.01) |
| G06F 3/16 | (2006.01) |
| B65D 41/04 | (2006.01) |
| B65D 51/24 | (2006.01) |
| H04R 3/00 | (2006.01) |

(52) U.S. Cl.
CPC .......... H04R 1/025 (2013.01); B65D 41/04 (2013.01); B65D 51/24 (2013.01); G06F 3/165 (2013.01); H04R 1/023 (2013.01); H04R 1/028 (2013.01); H04R 3/00 (2013.01); H04R 2420/07 (2013.01)

(58) Field of Classification Search
CPC ........ H04R 1/028; H04R 5/023; H04R 1/025; H04R 3/00; B65D 41/04; G06F 3/165
USPC .......................................................... 381/334
See application file for complete search history.

(56) References Cited

U.S. PATENT DOCUMENTS

| 2008/0165997 A1* | 7/2008 | Skurdal | ................. | H04R 5/023 381/334 |
| 2014/0306025 A1* | 10/2014 | Lee | ........................ | B05B 17/08 239/18 |
| 2015/0271582 A1* | 9/2015 | Cheng | .................... | H04R 1/028 381/334 |
| 2017/0340146 A1* | 11/2017 | Alexander | ........... | A47G 19/027 |
| 2018/0242644 A1* | 8/2018 | Bessant | ................. | A24F 47/008 |

* cited by examiner

Primary Examiner — Vivian C Chin
Assistant Examiner — Ubachukwu A Odunukwe
(74) Attorney, Agent, or Firm — Keith L. Jenkins, Registered Patent Attorney, LLC; Keith L. Jenkins (57) ABSTRACT

The housing for a wireless audio speaker includes an inner threaded portion that is complimentary to a drinking bottle threaded neck portion, enabling the housed speaker to be screwed onto a drinking bottle neck. The housing contains a misting subsystem including an atomizer enabling expulsion of water from the bottle out of the speaker housing as a mist. The system includes an electronic chip that performs additional electronic functions including a built-in light emitting diode (LED). The system includes an attachment subsystem including a handlebar-type clamp with an extension having a replica threaded bottle neck to which the speaker housing can be attached. When attached to a person, the housed audio speaker can perform the additional electronic functions of: heart rate sensor, pedometer, step counting and recording, calorie calculation, and distance calculation. A lost phone alarm can be generated if the smartphone is left more than a predetermined distance away.

20 Claims, 7 Drawing Sheets

MULTIFUNCTIONAL AUDIO SPEAKER SYSTEM

RELATIONSHIP TO OTHER APPLICATIONS

The present application claims the benefit, under the Paris Convention, of Chinese utility model application No. 201720981137.9 filed Aug. 8, 2017 to the same inventors.

FIELD OF ART

The present invention relates to a wireless audio speaker in a novel structure. The present invention more particularly relates to an audio speaker structure that can function as a bottle cap, an attachment to a rod, or be hand held, or attached to a person and can perform additional electronic functions.

BACKGROUND OF THE INVENTION

Speakers are indispensable audio devices in modern life, and can play beautiful music by using built-in playing components, bringing people pleasant listening experience. Currently, some speakers tend to be large-scale and high-end, while some tend to be small and integrated. With advantages of a small size, nice appearance, being easy to carry, and the like, such small speakers are popular with music fans. However, most small speakers have only the function of playing music. In addition, the small speakers are usually placed at particular positions and cannot be flexibly mounted. When people need to enjoy music while riding on bicycles, running on running machines, or participating in other activities, such speakers are inconvenient in use, making it difficult to better meet these requirements of people. Finding a way to provide auxiliary speakers for handheld electronic devices continues to be a challenge.

SUMMARY OF THE INVENTION

Briefly described, the housing for a wireless audio speaker includes an inner threaded portion that is complimentary to a drinking bottle threaded neck portion, enabling the housed speaker to be screwed onto a drinking bottle neck. The housing contains a misting subsystem including an atomizer enabling expulsion of water from the bottle out of the speaker housing as a mist. The system includes an electronic chip that performs additional electronic functions including a built-in light emitting diode (LED). The system includes an attachment subsystem including a handlebar-type clamp with an extension having a replica threaded bottle neck to which the speaker housing can be attached. When attached to a person, the housed audio speaker can perform the additional electronic functions of: heart rate sensor, pedometer, step counting and recording, calorie calculation, and distance calculation. A lost phone alarm can be generated if the smartphone is left more than a predetermined distance away.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
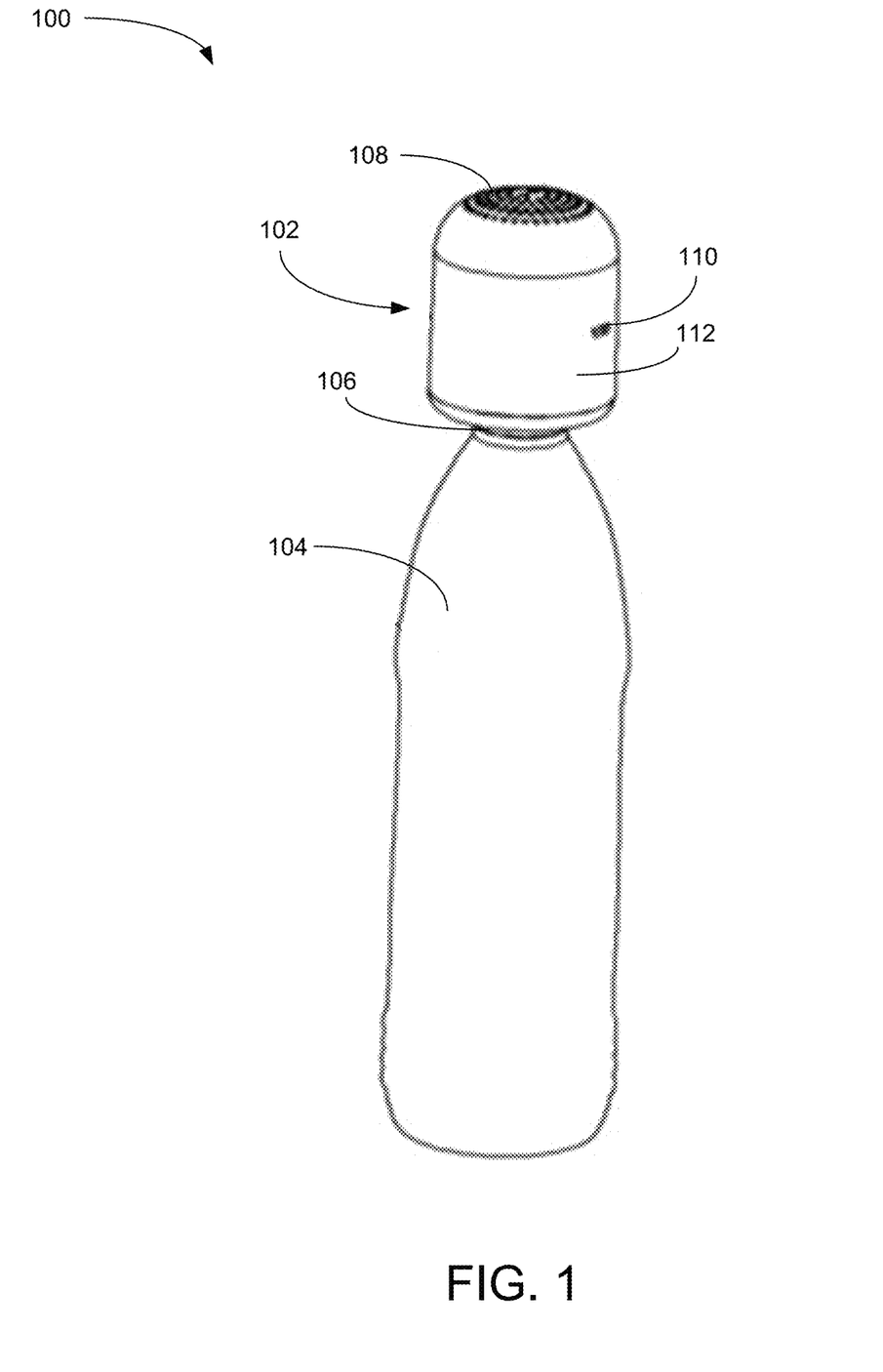
FIG. 1 is a side elevation view illustrating a first exemplary embodiment of the multifunctional audio speaker system, according to a preferred embodiment of the present invention.
Figure 5:
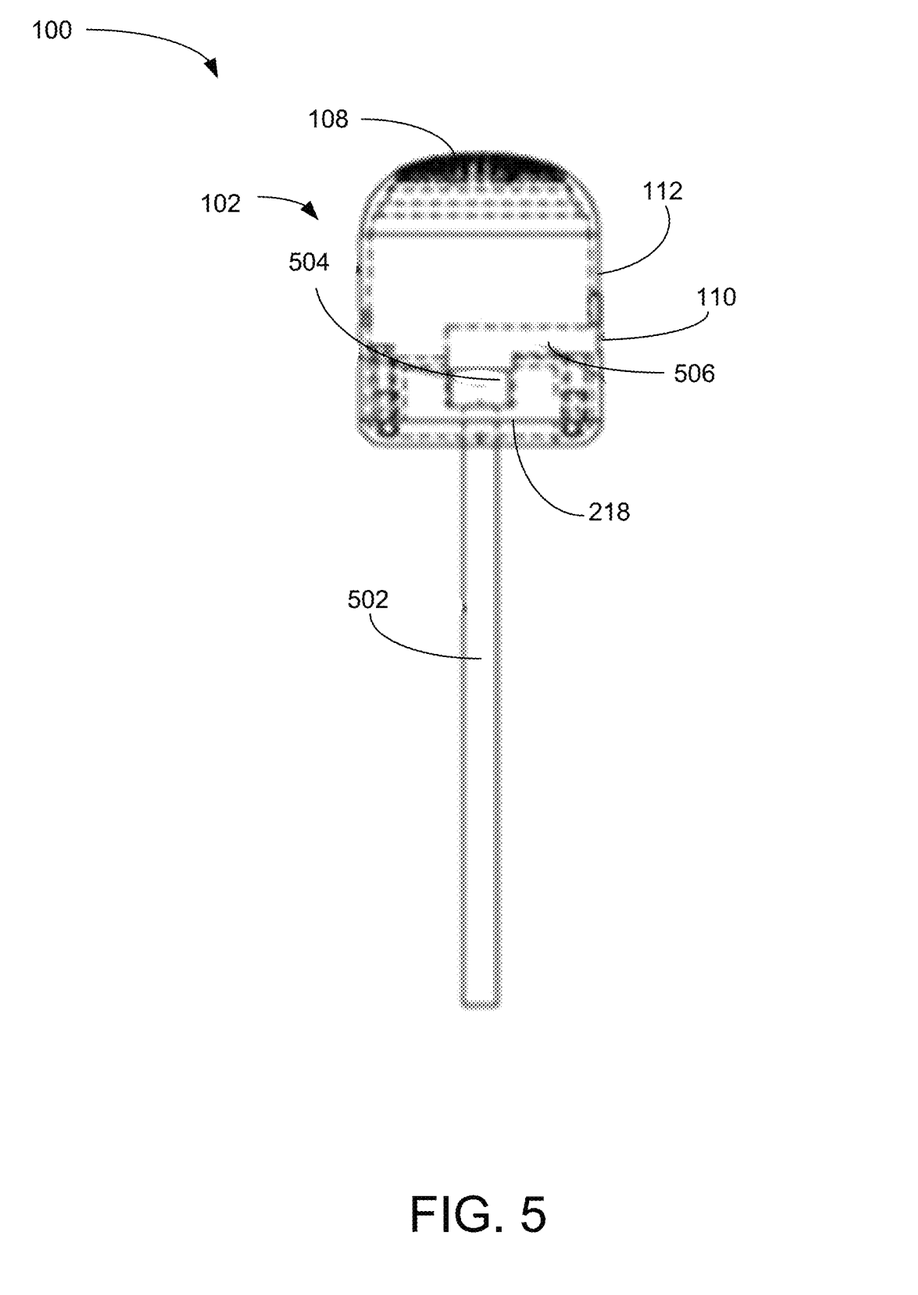
FIG. 5 is a side x-ray view illustrating s feature of the first exemplary embodiment the multifunctional audio speaker system of FIG. 1, according to a preferred embodiment of the present invention.
Figure 10:
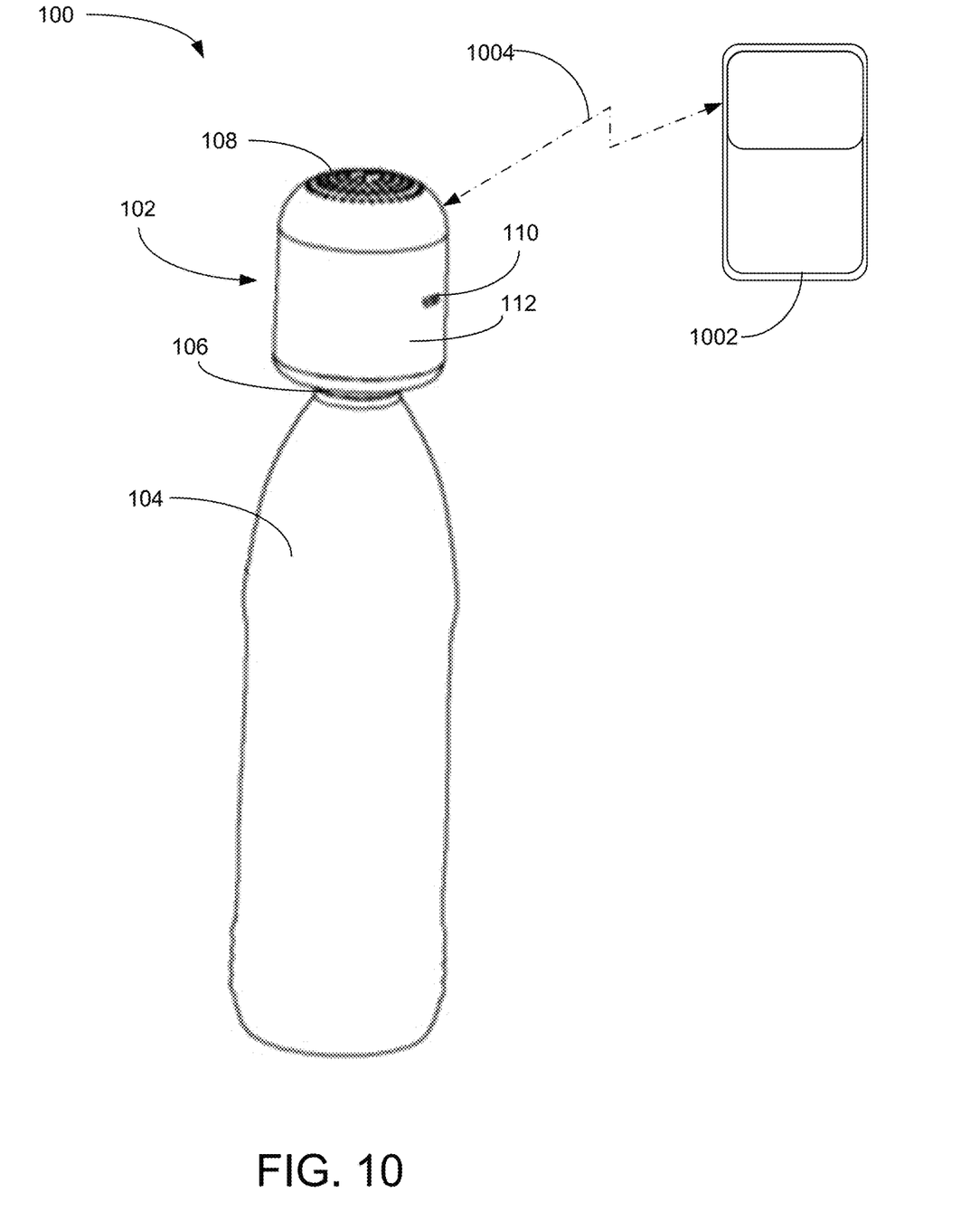
FIG. 10 is a side elevation view illustrating a first exemplary embodiment of the multifunctional audio speaker system of FIG. 1 in communication with a smart phone, according to a preferred embodiment of the present invention.

As used and defined herein, words of relative position such as "top", "bottom" etc., are referenced to the operational orientation of the invention, as shown in FIGS. 1, 5, and 10.

FIG. 1 is a side elevation view illustrating a first exemplary embodiment of the multifunctional audio speaker system 100, according to a preferred embodiment of the present invention. The multifunctional audio speaker system includes a multifunctional audio speaker 102 and a plurality of mounting options, one of which is illustrated as the first exemplary embodiment of FIG. 1.

Multifunctional audio speaker 102 is shown with speaker housing 112 fastened to bottle 104 by threaded attachment, as with conventional twist-on water bottle caps. Speaker housing 112 includes a speaker grill 108, an ON/OFF push button 212 (see FIG. 2) and a misting port 110. Bottle 104 has a threaded neck 106. Speaker housing 112 is illustrated for a particular size of water bottle 104, but that is merely exemplary. Various sizes of housings 112 may be made for respective various sizes of water bottles 104. In a particular embodiment, housing 112 may be sold with an adapter 700 (see FIG. 7) for attaching speaker housing 112 to a larger water bottle neck.

Figure 2:
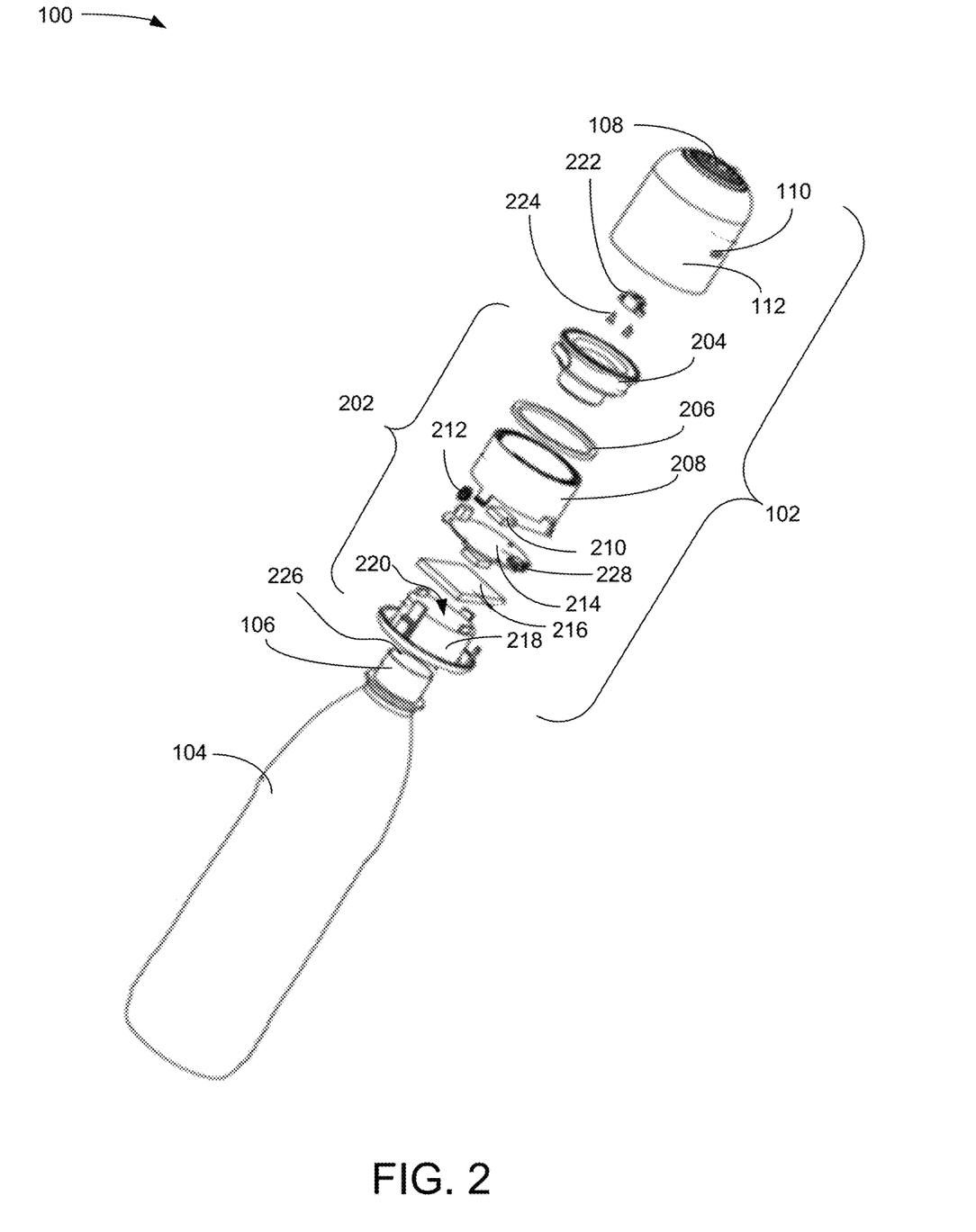
FIG. 2 is an exploded perspective view illustrating the first exemplary embodiment of the multifunctional audio speaker system of FIG. 1, according to a preferred embodiment of the present invention.

FIG. 2 is an exploded perspective view illustrating the first exemplary embodiment of the multifunctional audio speaker system 100 of FIG. 1, according to a preferred embodiment of the present invention. The multifunctional audio speaker 102 includes a base 218, a fixing base 208 detachably mounted on the base 218, and a housing 112 that is detachably engaged with and mounted on the base 218 and that encloses the fixing base 208. A speaker grill 108 is disposed on the top of the housing 112 for music broadcast. An inner threaded hole 220 is disposed within the base 218 and has threads compatible with the threads on threaded bottle neck 106. The audio playing component 202 includes a lithium battery 216 and a printed circuit board (PCB) 214 that are sealed and mounted in the fixing base 208, and an audio speaker 204 sealed and mounted on the top of the fixing base 208. Spacers 210 (one of two labeled) for sealing and mounting are disposed both between the lithium battery 216 and the PCB 214 and between the PCB 214 and the audio speaker 204. The spacer 210 is preferably an ethylene-vinyl acetate (EVA) hard sponge spacer 210. A seal ring 206 for sealing and mounting is also disposed between the audio speaker 204 and the top of the fixing base 208. A wire guide 222 is fixedly mounted using screws 224 (one of two labeled) and is preferably disposed inside the housing 112. A push button 212 is disposed on an outer surface of the upper cover 112, and is preferably configured to enable or disable (toggle) the audio playing component 202 by means of pressing.

Water bottle 104 has an externally threaded bottle neck 106 (threads not shown in this view) terminating in an opening 226. Base 218 has an internally threaded surface (threads not shown) in the inner threaded hole 220 in which the threads are complimentary to the external threads on threaded bottle neck 106, enabling base 218 to be threaded onto threaded bottle neck 106. Lithium battery 216 is mounted in fixing base 218. Battery 216 is preferably a lithium battery which powers both the audio speaker 204 and the atomizer 504. In some embodiments, other types of batteries may be used.

Printed circuit board (PCB) 214 preferably includes a wireless transceiver, at least one accelerometer, an LED, and logic for additional electronic functions. Preferably, electronic chips used for modern electronic smart watches are used on PCB 214. An additional electronic function includes a built-in light emitting diode (LED). Push button 212 may be transparent or translucent to be illuminated by the LED when the audio playing component 202 is turned on. In other embodiments, the fixing base 208 and housing 112 may be partially transparent, either by being translucent or by having only a portion of their structures transparent. The multifunctional audio speaker 102 may also be attached to a person, in which case the multifunctional audio speaker 102 can perform the additional electronic functions of: heart rate sensor, pedometer, step counting and recording, calorie calculation, and distance calculation. When in communication with a smart phone 1002 (see FIG. 10), a reminder can be generated if the multifunctional audio speaker 102 is left more than a predetermined distance away from the smartphone 1002. Preferably, distance is sensed as signal strength.

Figure 3:
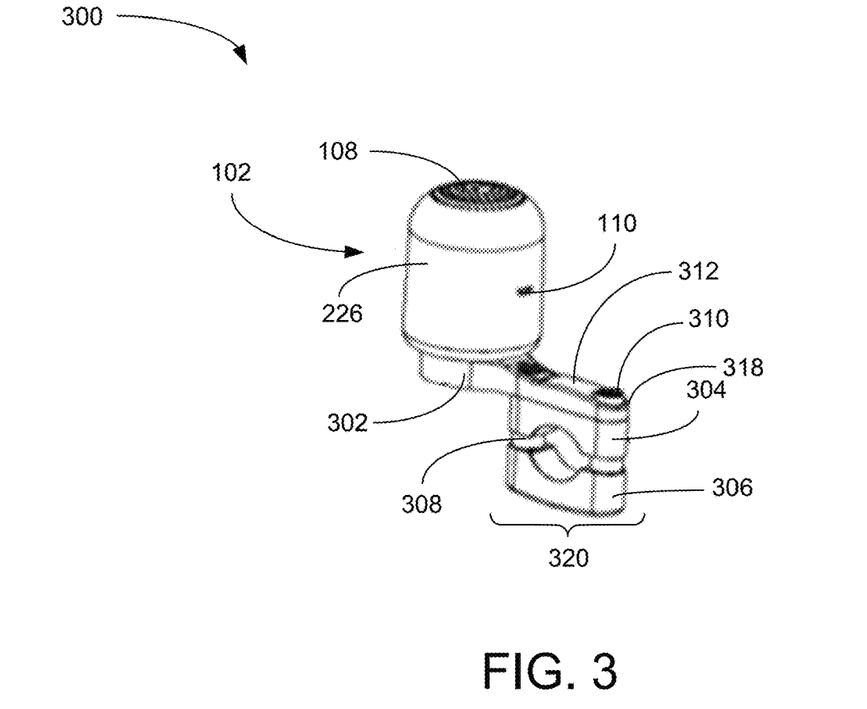
FIG. 3 is a perspective view illustrating a second exemplary embodiment of the multifunctional audio speaker system, according to a preferred embodiment of the present invention.
Figure 4:
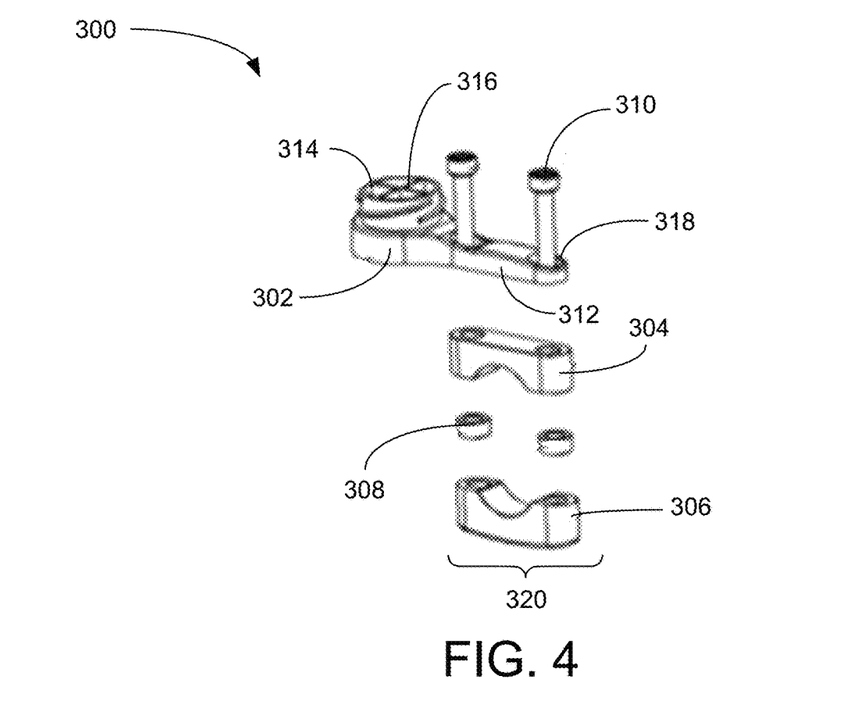
FIG. 4 is an exploded perspective view illustrating the second exemplary embodiment of the multifunctional audio speaker system of FIG. 3, according to a preferred embodiment of the present invention.

The multifunctional audio speaker 102 may be mounted in multiple ways. As shown in FIG. 1 and FIG. 2, according to the first embodiment of the multifunctional audio speaker system 100, the multifunctional audio speaker 102 may be detachably and threadably connected to an outer threaded bottle neck 106 of a water bottle 104 by means of the inner threaded hole 220 within the base 218. In this case, as shown in FIG. 5, a water inlet pipe 502 is disposed at the bottom of the multifunctional audio speaker 102, a lower end of the water inlet pipe 502 extends into the water bottle 104 and is initially submerged in water. An upper end of water inlet pipe 502 (see FIG. 5) extends into multifunctional audio speaker 102 and is releasably connected to an atomizer 504 (see FIG. 5), which has an output into a closed channel 506 (see FIG. 5) in fluidic communication with misting port 110 on the housing 112. Therefore, atomization can be provided anytime and anywhere simply by using the existing water bottle 104, achieving two purposes of adding a use function of the speaker and promoting product use comfortability FIG. 3 is a perspective view illustrating a second exemplary embodiment of the multifunctional audio speaker system 300, according to a preferred embodiment of the present invention. FIGS. 3 and 4 illustrate one embodiment of an attachment subsystem. Multifunctional audio speaker system 300 includes the same multifunctional audio speaker 102 as appears in FIGS. 1 and 2, but without releasable water inlet pipe 502 (see FIG. 5). Attachment base 302 couples with multifunctional audio speaker 102 and has an extension 312, illustrated here as a handlebar clamp support 312. Handlebar clamp support 312 receives two releasable fasteners 310 (one of two labeled) in respective fastener receivers 318 (one of two labeled) to fasten together top clamp portion 304, spacers 308 (one of two labeled), and bottom clamp portion 306, as shown, in order to secure attachment base 302 to a handlebar with handlebar clamp 320. Fastener receivers 318 (one of two labeled) are illustrated in FIG. 3 and FIG. 4 as countersunk bolt holes, but the invention is not so limited. Those of skill in the art, enlightened by the present disclosure, will appreciate the many other bar-shaped objects to which attachment base 302 may be clamped. For non-limiting examples, backpack frames, walking sticks, canes, tubular frame members generally, and rear-view mirror supports. In various other embodiments, top and bottom clamp portions may be sized for larger or smaller bars. In various other embodiments, top and bottom clamp portions may be shaped to attach to bars of polygonal, conic section, or irregular cross sections.

FIG. 4 is an exploded perspective view illustrating the second exemplary embodiment of the multifunctional audio speaker system 300 of FIG. 3, according to a preferred embodiment of the present invention. Attachment base 302 supports a replica 314 of a threaded bottle neck 106 extending upward from attachment base 302. Multifunctional audio speaker 102 may be threadably connectable to replica 314, as shown in FIG. 3. Internal supports 316 make replica 314 stronger. Misting is not available with multifunctional audio speaker system 300, although the atomizer 504 (see FIG. 5) and closed channel 506 (see FIG. 5) remain in multifunctional audio speaker 102.

FIG. 5 is a side x-ray view illustrating s feature of the first exemplary embodiment the multifunctional audio speaker system 100 of FIG. 1, according to a preferred embodiment of the present invention. Preferably, water inlet pipe 502 is not centered on the multifunctional audio speaker 102, but extends upward from within the water bottle 104, through opening 226, through a gap between the square lithium battery 216 and the round base 218, through a hole 228 in the PCB 214, to the atomizer 504 within the fixing base 208 and outward through the closed channel 506 along an inside surface of the speaker housing 112 to the misting port 110, as shown. Water inlet pipe 502 is preferably releasably attached to atomizer 504. In some embodiments, water inlet pipe 502 may be a hose. The path for air entering the water bottle 104 as water is drawn out by the atomizer 504 is via an opening (not shown) in the speaker housing proximate the push button 212 and through a space between the square battery 216 and the round fixing base 208.

Figure 6:
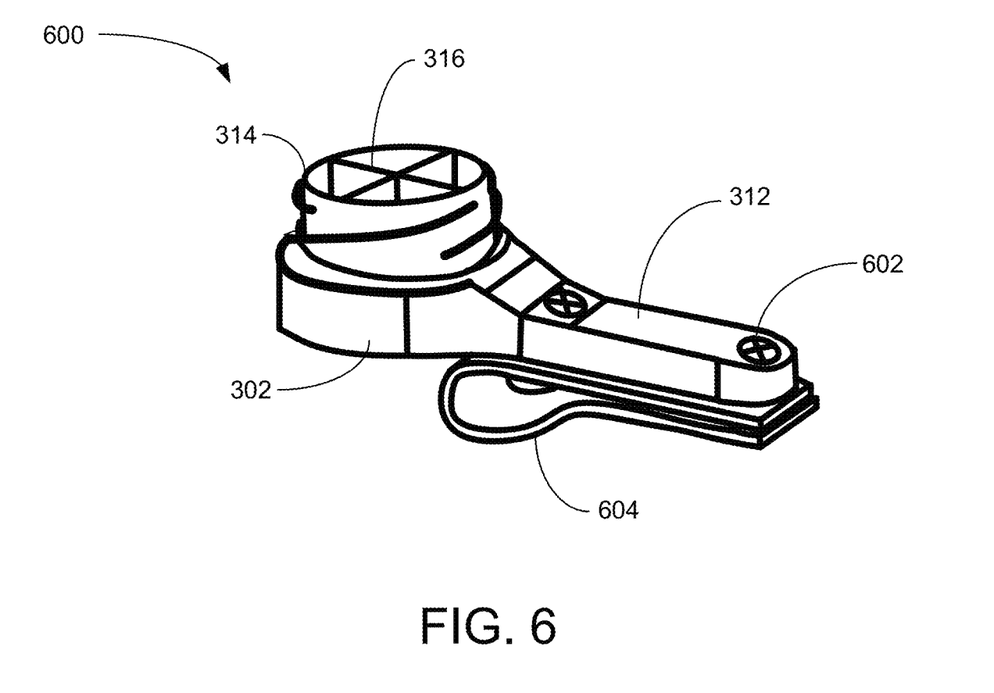
FIG. 6 is a side perspective view illustrating a third exemplary embodiment of the multifunctional audio speaker system of FIG. 4, according to a preferred embodiment of the present invention.

FIG. 6 is a side perspective view illustrating a third exemplary embodiment of the multifunctional audio speaker system 600 of FIG. 4, according to a preferred embodiment of the present invention. FIGS. 6-9 illustrate embodiments of the attachment subsystem. Multifunctional audio speaker system 600 uses the attachment base 302 of the embodiment of FIG. 4, but attaches a personal connector 604, illustrated as a spring clip 604, in place of the handlebar clamp 320. Fasteners 602 (one of two labeled) are customized to the particular embodiment. Those of skill in the art, enlightened by the present disclosure, will be aware of the vast array of personal connectors available. For non-limiting examples, lanyards, wrist bands, scissor spring clips, snaps, buttons, hook and loop fasteners, etc. When attached to a person, the additional electronic functions operate, including heart rate sensor, pedometer, step counting and recording, calorie calculation, and distance calculation. The data produced by the additional electronic functions is displayable on a wireless-transceiver equipped computing device, such as a smart phone 1002 (see FIG. 10). Misting is not available in multifunctional audio speaker system 600, as the water inlet pipe 502 must be released.

Figure 7:
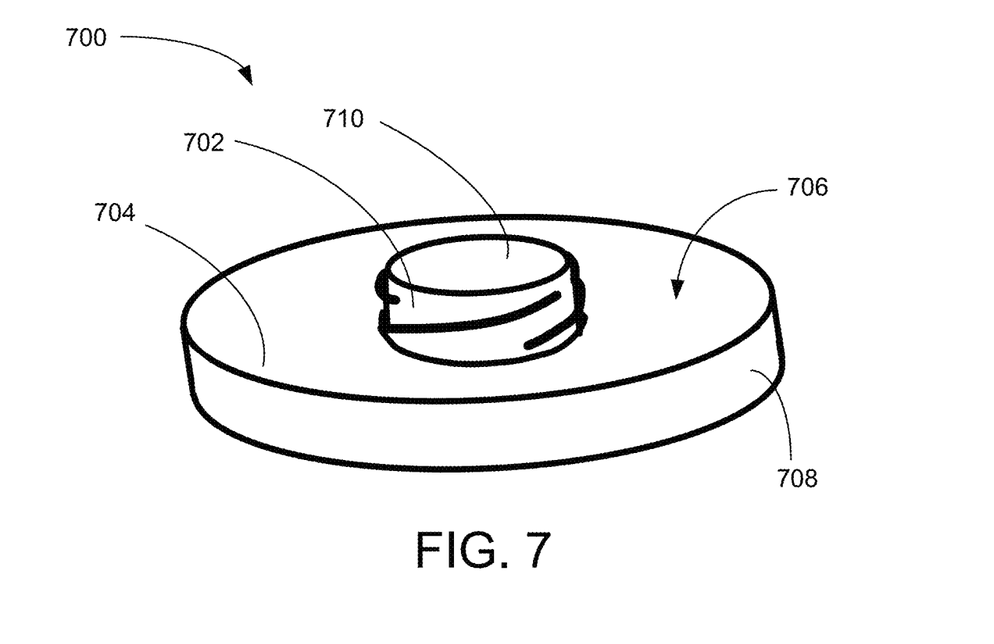
FIG. 7 is a perspective view illustrating an exemplary embodiment of an adapter for the multifunctional audio speaker system of FIG. 1, according to a preferred embodiment of the present invention.

FIG. 7 is a perspective view illustrating an exemplary embodiment of an adapter 700 for the multifunctional audio speaker 102 of FIG. 5, according to a preferred embodiment of the present invention. Adapter 700 uses a second type of replica 702 of a threaded bottle neck 106 mounted on a screw-on lid 704 configured for a larger water bottle. The inner surface of circumferential lid wall 708 supports the internal threads. Replica 702 has an opening 710 that goes through the top surface 706 of screw-on lid 704, enabling misting from the larger water bottle. Replica 702 does not have the internal supports 316 of replica 314.

Figure 8:
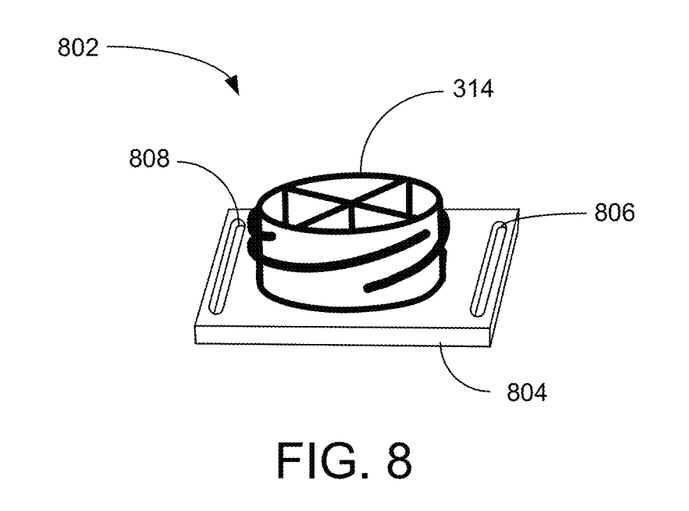
FIG. 8 is a perspective view illustrating an exemplary embodiment of a strap-mountable base for the multifunctional audio speaker system of FIG. 1, according to a preferred embodiment of the present invention.

FIG. 8 is a perspective view illustrating an exemplary embodiment of a strap-mountable base 802 for the multifunctional audio speaker 102 of FIG. 1, according to a preferred embodiment of the present invention. Strap-mountable base 802 includes a panel 804 which supports a replica 314 of a threaded bottle neck 106 extending upward from panel 804. Multifunctional audio speaker 102, without water inlet pipe 502 installed, is threadably connectable to replica 314, as shown in FIG. 3. Panel 804 includes fastener receivers 808 and 806, illustrated as strap-receiving slots. In various embodiments, various respective fastener receivers 808 and 806, may be used. For non-limiting examples, watch bands, wrist straps, ankle bands, and necklaces. Misting is not available with strap-mountable base 800, although the atomizer 504 (see FIG. 5) and closed channel 506 (see FIG. 5) remain in multifunctional audio speaker 102.

Figure 9:
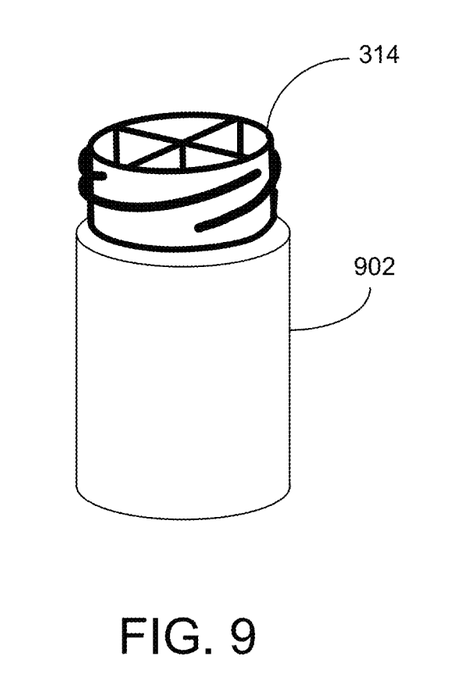
FIG. 9 is a perspective view illustrating an exemplary embodiment of a hand-held base for the multifunctional audio speaker system of FIG. 1, according to a preferred embodiment of the present invention.

FIG. 9 is a perspective view illustrating an exemplary embodiment of a hand-held base 902 for the multifunctional audio speaker 102 of FIG. 1, according to a preferred embodiment of the present invention. Replica 314 is fixed to a hand-held base 902, which may be, in various embodiments, a cylindrical shell, a solid cylinder, a releasably closable container for multifunctional audio speaker 102, where "cylindrical" includes cylinders with cross sections of conic sections, polygons, or irregular cross sections. In some embodiments, the cross section may vary along the length of the hand-held base 902.

FIG. 10 is a side elevation view illustrating a first exemplary embodiment of the multifunctional audio speaker system 100 of FIG. 1 in wireless communication 1004 with a smart phone 1002, according to a preferred embodiment of the present invention. The output data of the additional electronic functions, including heart rate sensor, pedometer, step counting and recording, calorie calculation, and distance calculation, may be read on a wirelessly linked 1004 smart phone via an application resident on the smartphone 1002. Smartphone 1002 is preferably the source of music played by the audio playing component 202, which is wirelessly transmitted 1004 to the wireless transceiver on the PCB 214. The wireless connection 1004 is preferably a Bluetooth® wireless connection 1004. In various embodiments, other wireless sources of music signals may be used.

We claim:

1. A multifunctional audio speaker system comprising:
   a. a housing;
   b. a wireless audio playing component mounted within said housing proximate a top end of said housing; and
   c. an atomizer mounted within said housing; and
   d. a battery mounted within said housing and connected to supply electrical power to said wireless audio playing component and to said atomizer;
   e. a water inlet pipe extending downward from within said housing;
   f. wherein said water inlet pipe comprises a length sufficient for extending into a water bottle upon which said housing is operable to be mounted;
   g. said atomizer in releasable fluidic communication with a top end of said water inlet pipe; and
   h. a closed channel within said housing in fluidic communication between said atomizer and a misting port in said housing.

2. The system of claim 1, comprising:
   a. an internally threaded cylindrical channel in a bottom end of said housing, wherein said channel is configured to be threadingly connectable to an externally threaded neck of a predetermined drinking water bottle; and
   b. at least one of:
      i. a first personal attachment comprising
         1. a base supporting a replica of said drinking bottle neck;
         2. an extension from said base; and
         3. at least one fastener receiver in said extension;
      ii. a handheld attachment comprising an elongated member supporting said replica of said drinking bottle neck on an end thereof;
      iii. a second personal attachment comprising:
         1. a base supporting a replica of said drinking bottle neck;
         2. at least one fastener receiver in said base; and
         3. a personal connector releasably fastenable to said base; and
      iv. an adapter configured to couple to a larger threaded bottle neck.

3. The system of claim 2, comprising a bar clamp releasably fastenable to said extension.

4. The system of claim 2, comprising a personal connector releasably fastenable to said extension.

5. The system of claim 1, comprising a printed circuit board (PCB) within said housing, said PCB comprising an opening through which said water inlet pipe extends.

6. The system of claim 1, wherein said housing comprises:
   a. a base comprising said internally threaded cylindrical channel;
   b. a fixing base configured for internal component support and releasably mounted on said base; and
   c. a speaker housing mounted on said base and enclosing said fixing base.

7. The system of claim 6, comprising:
   a. a speaker grill in said speaker housing;
   b. a misting port in said speaker housing; and
   c. an ON/OFF switch extending through an opening in said speaker housing.

8. The system of claim 7, comprising at least one of:
   a. an at least partially transparent said ON/Off switch; and
   b. an at least partially transparent said fixing base and an at least partially transparent said housing.

9. The system of claim 6, wherein said audio playing component comprises:
 a. said battery mounted within said fixing base;
 b. a PCB electrically connected to said battery and mounted within said fixing base; and
 c. an audio speaker mounted on top of said fixing base and connected for communication with said PCB.

10. The system of claim 9, wherein said PCB comprises:
 a. a wireless transceiver operable to communicate with a smartphone;
 b. at least one accelerometer;
 c. a light emitting diode;
 d. logic and sensors operable to perform the functions of:
  i. heart rate determination;
  ii. pedometer;
  iii. step counting and recording;
  iv. calorie calculation;
  v. distance calculation;
  vi. loss or degradation of signal from a source of audio input signal; and
 e. an opening through which said water inlet pipe extends.

11. A multifunctional audio speaker system comprising:
 a. a base comprising an internally threaded cylindrical channel;
 b. wherein said internally threaded cylindrical channel is configured to be threadingly connectable to an externally threaded neck of a conventional drinking water bottle;
 c. a fixing base configured for internal component support and releasably mountable on said base;
 d. a speaker housing mountable on said base and configured to enclose said fixing base;
 e. a wireless audio playing component mounted within said housing proximate a top end of said housing;
 f. an atomizer mounted within said housing;
 g. a battery mounted on said fixing base and connected to supply electrical power to said wireless audio playing component and to said atomizer;
 h. a misting port in said speaker housing;
 i. a water inlet pipe extending downward from within said housing;
 j. wherein said water inlet pipe comprises a length sufficient for extending into said water bottle;
 k. an atomizer within said housing and in releasable fluidic communication with a top end of said water inlet pipe; and
 l. a closed channel within said housing in fluidic communication between said atomizer and said misting port in said speaker housing.

12. The system of claim 11, comprising:
 a. a speaker grill in said speaker housing; and
 b. an ON/OFF switch extending through an opening in said speaker housing.

13. The system of claim 12, comprising at least one of:
 a. an at least partially transparent said ON/Off switch; and
 b. an at least partially transparent said fixing base and said housing.

14. The system of claim 12, comprising a printed circuit board (PCB) within said housing, said PCB comprising an opening through which said water inlet pipe extends.

15. The system of claim 11, comprising one of:
 a. a first personal attachment comprising
  i. a base supporting a replica of said drinking bottle neck;
  ii. an extension from said base;
  iii. at least one fastener receiver in said extension; and
  iv. one of:
   1. a bar clamp releasably fastenable to said extension; and
   2. a personal connector releasably fastenable to said extension;
 b. a handheld attachment comprising an elongated member supporting said replica of said drinking bottle neck on an end thereof;
 c. a second personal attachment comprising:
  i. a base supporting a replica of said drinking bottle neck;
  ii. at least one fastener receiver in said base; and
  iii. a personal connector releasably fastenable to said base; and
 d. an adapter configured to couple to a larger threaded bottle neck.

16. The system of claim 11, wherein said audio playing component comprises:
 a. said battery mounted within said fixing base;
 b. a PCB electrically connected to said battery and mounted within said fixing base; and
 c. an audio speaker mounted on top of said fixing base and connected for communication with said PCB.

17. The system of claim 16, wherein said PCB comprises:
 a. a wireless transceiver operable to communicate with a smartphone;
 b. at least one accelerometer;
 c. a light emitting diode; and
 d. logic and sensors operable to perform the functions of:
  i. heart rate determination;
  ii. pedometer;
  iii. step counting and recording;
  iv. calorie calculation;
  v. distance calculation;
  vi. loss or degradation of signal from a source of audio input signal; and
  vii. communication with said PCB.

18. A multifunctional audio speaker system comprising:
 a. a base comprising an internally threaded cylindrical channel;
 b. wherein said internally threaded cylindrical channel is configured to be threadingly connectable to an externally threaded neck of a conventional drinking water bottle;
 c. a fixing base configured for internal component support and releasably mountable on said base;
 d. a speaker housing mountable on said base and configured to enclose said fixing base;
 e. a wireless audio playing component mounted within said housing proximate a top end of said housing;
 f. an atomizer mounted within said housing;
 g. a battery mounted within said fixing base and connected to supply electrical power to said wireless audio playing component and to said atomizer;
 h. a speaker grill in said speaker housing;
 i. a misting port in said speaker housing; and
 j. an ON/OFF switch extending through an opening in said speaker housing;
 k. at least one of:
  i. an at least partially transparent said ON/Off switch;
  ii. an at least partially transparent said fixing base and an at least partially transparent said housing;
 l. said battery mounted in said fixing base;
 m. a PCB electrically connected to said battery and mounted in said fixing base;
 n. an audio speaker mounted on top of said fixing base and connected for audio communication with said PCB;
 o. wherein said PCB comprises:
  i. a wireless transceiver operable to communicate with a smartphone;
  ii. at least one accelerometer;
  iii. a light emitting diode;

iv. logic and sensors operable to perform the functions of:
  1. heart rate determination;
  2. pedometer;
  3. step counting and recording;
  4. calorie calculation;
  5. distance calculation; and
  6. loss or degradation of signal from a source of audio input signal.

19. The system of claim 18, wherein said audio playing component comprises said PCB further comprising an opening through which said water inlet pipe extends.

20. The system of claim 19, comprising one of:
a. a misting sub system comprising:
  i. a water inlet pipe extending downward from within said housing;
  ii. wherein said water inlet pipe comprises a length sufficient for extending into said water bottle;
  iii. an atomizer within said housing and in releasable fluidic communication with a top end of said water inlet pipe; and
  iv. a closed channel within said housing in fluidic communication between said atomizer and said misting opening in said housing; and
b. an attachment subsystem comprising one of:
  i. a first personal attachment comprising
    1. a base supporting a replica of said drinking bottle neck;
    2. an extension from said base;
    3. at least one fastener receiver in said extension; and
    4. one of:
      a. a bar clamp releasably fastenable to said extension; and
      b. a personal connector releasably fastenable to said extension;
  ii. a handheld attachment comprising an elongated member supporting said replica of said drinking bottle neck on an end thereof;
  iii. a second personal attachment comprising:
    1. a base supporting a replica of said drinking bottle neck;
    2. at least one fastener receiver in said base; and
    3. a personal connector releasably fastenable to said base; and
  iv. an adapter configured to couple to a larger threaded bottle neck.

* * * * *